United States Patent [19]

Morizot

[11] Patent Number: 4,777,415
[45] Date of Patent: Oct. 11, 1988

[54] METHOD OF AND CIRCUITRY FOR GENERATING INFORMATION RELATING TO SPEED OF ROTATION IN A CIRCUIT FOR CONTROLLING A BRUSHLESS DIRECT-CURRENT MOTOR IN ORDER TO REGULATE IT WITH DIGITAL CONTROLS

[75] Inventor: Gerard Morizot, Villingen-Schwenningen, Fed. Rep. of Germany

[73] Assignee: Deutsche Thomson-Brandt GmbH, Villingen-Schwenningen, Fed. Rep. of Germany

[21] Appl. No.: 928,293

[22] Filed: Nov. 4, 1986

[30] Foreign Application Priority Data

Nov. 14, 1985 [DE] Fed. Rep. of Germany ....... 3540396

[51] Int. Cl.[4] .............................................. H02P 6/02
[52] U.S. Cl. ..................................... 318/254; 318/138
[58] Field of Search ........................ 318/138, 254, 439

[56] References Cited

U.S. PATENT DOCUMENTS

| | | |
|---|---|---|
| 3,906,320 | 9/1975 | Doemen ........................... 318/138 X |
| 3,924,166 | 12/1975 | Doemen ............................. 318/138 |
| 4,070,606 | 1/1978 | Morozumi et al. ................. 318/254 |
| 4,097,788 | 6/1978 | Nygaard et al. ................. 318/138 X |
| 4,394,594 | 7/1983 | Schmider et al. ............... 318/254 X |
| 4,409,524 | 10/1983 | Nielsen et al. .................... 318/138 |
| 4,595,865 | 6/1986 | Jahns ................................... 318/254 |
| 4,631,459 | 12/1986 | Fujioka et al. ..................... 318/254 |

*Primary Examiner*—Bentsu Ro
*Attorney, Agent, or Firm*—Max Fogiel

[57] ABSTRACT

The invention concerns a speed-control system, method and circuit for carrying out the system, for a brushless direct-current motor using a digital servo loop, specifically an economical and simple means of generating precise information relating to speed of rotation that can also be converted into digital words that can be processed by a microprocessor or by wired components in normal digital switching circuits like counters, gates, adders and subtractors, flip-flops, multipliers, memories, etc. The motor has a permanent-magnet rotor. The voltage at at least one of the stator windings is employed to generate speed information. This is converted by means of a threshold detector into a rectangular wave that can be further processed by the circuit.

2 Claims, 2 Drawing Sheets

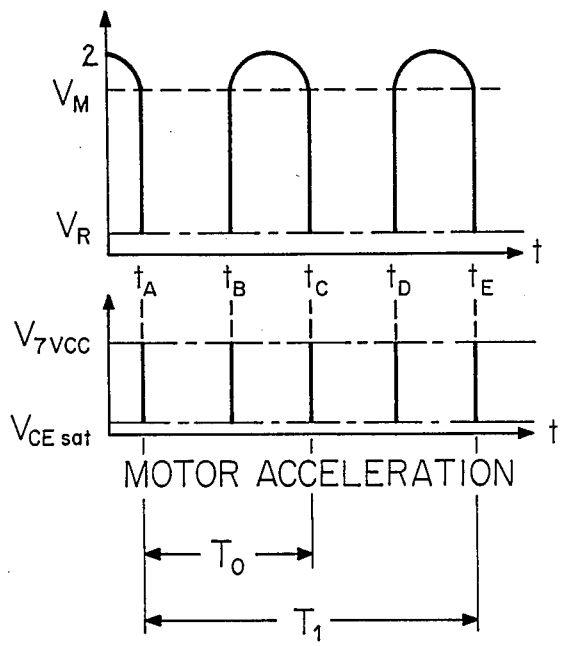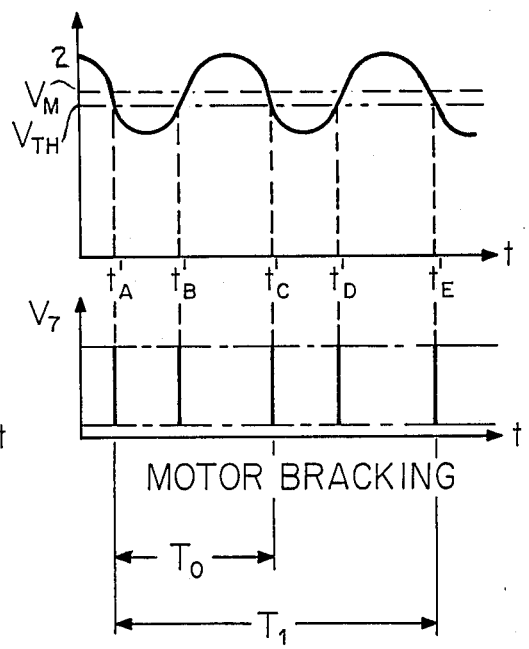

METHOD OF AND CIRCUITRY FOR GENERATING INFORMATION RELATING TO SPEED OF ROTATION IN A CIRCUIT FOR CONTROLLING A BRUSHLESS DIRECT-CURRENT MOTOR IN ORDER TO REGULATE IT WITH DIGITAL CONTROLS

BACKGROUND OF THE INVENTION

The invention concerns a speed-control system for a brushless direct-current motor using a digital servo loop, specifically an economical and simple means of generating precise information relating to speed of rotation that can also be converted into digital words that can be processed by a microprocessor or by wired components in normal digital switching circuits like counters, gates, adders and subtractors, flip-flops, multipliers (such as arithmetic and logic circuits), memories, etc.

The present invention is applicable to brushless motors of this type that have a speed higher than 10 rpm, like those employed to operate turntables for normal and digital record players, and audio or video tape recorders.

Speed-control systems for brushless direct-current motor can, as is known, utilize a number of devices to supply speed information to their shaft. An example of such a device is a light barrier with a source of infrared radiation that emits a slender beam of light, with a detector for the radiation positioned where it can receive the beam either directly or reflected from a mirror, and with a rotating component that extends into the path of the light and affects its transmission to the detector. The rotating component can be a perforated disk mounted on the shaft of the motor that deflects the beam to the detector every time its shaft rotates once. The detector can be a phototransistor or photodiode that releases one pulse per rotation. The disk can be replaced with a rotating finger that interrupts the beam every time the shaft rotates once. Another way of employing a light barrier is to mount a rotating mirror on a component driven by the shaft and to position a light source and a detector in such a way that the beam of light will strike the surface of the detector once per revolution. The interval of time between the beginning or end of two subsequent pulses emitted by the detector can be measured and the result of the measurement be compared with a stored digital value. The difference is employed as an error signal in a regulating loop in such a way that the operating voltage at the stator windings is varied in order to minimize the difference.

Another known way of generating a signal that contains information relating to the speed of rotation of the shaft of a motor consists of using a tachometer-generator of the type that has a peripheral annular magnet, preferably surrounding the permanent-magnet rotor, with a number of poles that is a multiple of the number of rotor poles, and with a meandering circular or annular winding facing the outside of the ring and mounted on the substrate of a printed circuit. The signal induced in this tachometer winding has an amplitude and frequency proportional to the speed of the motor. The frequency of the signal can be utilized to derive a digital value employed in the control loop.

Both of the aforementioned means of generating speed information demand additional mechanical, opto-electrical, or magnetic components, and the latter entails an increase in the height of the axial air gap between the permanent-magnet rotor and the stator-drive coils. This decreases the motor torque. Furthermore, the induced-signal amplitude in the meander winding is relatively small (on the order of 5 mV) and must accordingly be amplified, filtered, and limited (sliced) to obtained a practical rectangular signal for a digital switching circuit or for microprocessors. All of this leads to increased expense. A circuit that employs the output voltage of a tachometer-generator is disclosed in FIG. 9 of U.S. Pat. No. 4,394,594 or GB Patent No. 1 563 228 or the corresponding German OS No. 2 533 187.

Another method of controlling the speed of a brushless direct-current motor with a permanent-magnet rotor is specified in U.S. Pat. No. 3,924,166 or French Patent Application No. 2 204 073, corresponding to German OS P No. 2 251 292 (FIG. 1). This method employs the opposing electromagnetic force (emf) induced in the drive coils that constitute the stator windings while switching transistors downstream of the direct-current source are turned off. The opposing emf has a polarity that is opposite that of the voltage at the winding as long as the transistors are connected through and has the shape of half a sine wave with an amplitude proportional to the speed of the motor. The opposing emf's of all the windings are supplied through appropriate half-wave rectifier diodes to an adder network consisting of variable resistors, and the resulting current from this matrix-like addition is supplied along with a current from a constant-current source to the inverting input terminal of an operational amplifier. The other, non-inverting input terminal of the amplifier is connected to the terminal of a reference-voltage source that supplies a current corresponding to the desired speed. The output terminal of the operational amplifier is connected to the input electrode of a variable source of constant current interposed between one terminal of the source of voltage supply and the junction beteen all the emitters of the switching transistors of which the collectors constitute the load on the stator windings. This control loop, which employs the analog information from the opposing emf generated in all the windings, functions by varying the voltage at the windings when its corresponding series transistors are connected through, whereby the motor speed is governed.

SUMMARY OF THE INVENTION

The present invention exploits the time information or frequency information in the opposing emf induced in the windings by the rotation of the permanent-magnet rotor. This information can easily be converted to a digital value that can be directly processed by a microprocessor. It will be evident that the duration of the half wave of the sinusoidal opposing-emf wave form is directly related to the speed of the rotor. The advantage of the circuit in accordance with the present invention in relation to the state of the art, especially to the aforementioned analog servo loop, which also exploits opposing emf, is in its simplicity and low cost, because a microprocessor is usually already present in equipment that has a motor and can also be exploited for other functions. Furthermore, the circuit employs in its operation no components like potentiometers or precisely controlled voltages that have to be adjusted.

The invention will be better understood and other properties and advantages will become evident from the following specification and from the drawings.

BRIEF DESCRIPTION OF THE DRAWINGS

FIGS. 2A and 2B are diagrams of the voltage-wave from at one of the motor windings (W2) and at the microprocessor speed-information input terminal 7. Input terminal 7 is usually the microprocessor's interrupt.

DESCRIPTION OF THE PREFERRED EMBODIMENTS

Figure 1:
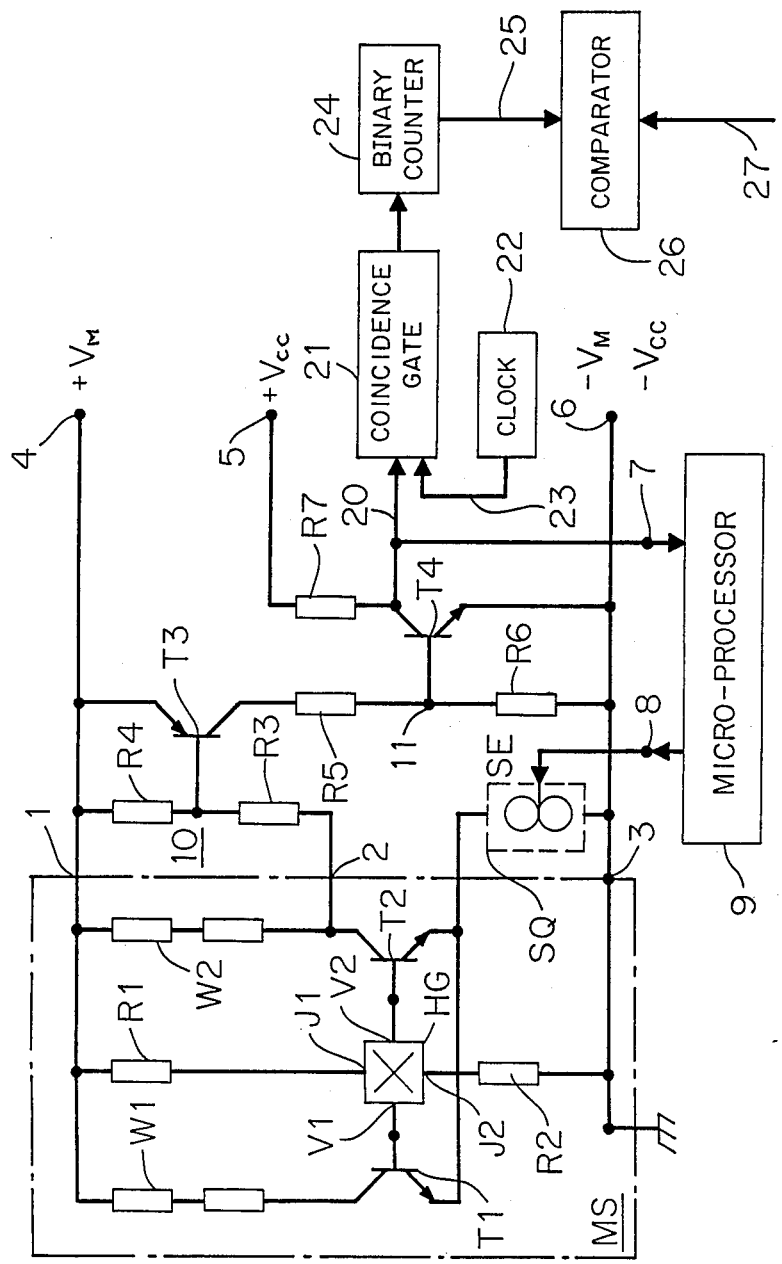
FIG. 1 is a circuit diagram illustrating the principle behind one component of a circuit for driving a brushless direct-current motor, showing the method and circuitry for generating the speed information in accordance with the invention.

The brushless direct-current motor with a permanent-magnet rotor illustrated in FIG. 1 has a stator-winding circuit MS with two windings W1 and W2, one terminal of each of which is connected to a positive supply-voltage terminal 1. The other terminal of windings W1 and W2 is connected to the collectors of switching transistors T1 and T2. Both windings W1 and W2 are positioned in relation to the permanent-magnet rotor, which has a number of alternatingly oriented magnetic poles (N & S, not illustrated), in such a way that, when the midpoint of a pole of given polarity is opposite winding W1, the center of the other winding W2 will be facing a pole of the opposite polarity. A Hall generator HG of known design is positioned in the trajectory of the magnetic poles of the rotor in such a way that its magnetic induction B is normal to the current flowing through it. This current is generated because positive supply-voltage terminal 1 is connected to a terminal J1 through a resistor R1 and negative supply-voltage terminal 3 (ground) is connected to a second 14 terminal J2 through another resistor R2.

Hall generator HG has two voltage-output terminals V1 and V2, which are connected to the bases of switching transistors T1 and T2 and which supply biases to them that vary in opposite senses, so that the transistors are connected through alternately depending on the rotational angle of the rotor The emitters of transistors T1 and T2 are connected to a common terminal that is connected to one of the terminals of a variable current source SQ. The other terminal of current source SQ is connected to negative supply-voltage terminal 3 and its control input terminal SE to a terminal 8 that emits a digital control signal.

The positive supply-input terminal 1 of circuit MS is connected to the positive terminal 4 ($+V_M$) of motor-voltage supply and the negative supply-input terminal 3 is connected to the circuit's negative terminal ($-V_M$) through a common ground terminal 6. The connection between second winding W2 and the collector of second transistor T2 is connected to an output terminal 2. The waveforms of voltage 2 are illustrated in the upper graphs in FIGS. 2A and 2B for two operating modes of the motor, specifically for acceleration, when the motor is started up-for example, and for braking, depending on the speed of the motor.

The upper diagram in FIG. 2A shows that, when transistor T2 is connected through at instant $t_A$, voltage 2 drops to a residual value $V_R$ that depends on the current supplied by current source SQ. This current is governed by the error signal in accordance with the difference between the actual motor speed and the desired motor speed (nominal value). The smaller the error signal resulting from the comparison of the electric or digital values or between the actual measured speed and the desired speed, the less current will flow through the winding and through the connected-through transistor and current source SQ in series.

Voltage 2 is supplied through a resistor-voltage divider consisting of two series-connected resistors R3 and R4 that are connected in parallel to output terminal to a third transistor T3 through its base. Transistor T3 complements switching transistors T1 and T2. In the present embodiment of motor-drive circuit MS transistors T1 and T2 are npn and transistor T3 is pnp. Its emitter is connected to positive supply-input terminal 1 (or 4 for $+V_M$), its base is located at the aforesaid voltage divider 10 consisting of the series-connected resistors R3 and R4, and its collector is connected to negative supply-input terminal 3 (corr. to 6) through another voltage divider 11 consisting of two series-connected resistors R5 and R6. Thus, pnp third transistor T3 operates as a common-emitter circuit and supplies to its collector, depending on a prescribed portion of the waveform 2 in FIG. 2A, a rectangular signal that varies between the levels zero and $+V_M$, which is for example too high to directly start a TTL or CMOS circuit. Third transistor T3 in this case plays the part of a threshold detector or voltage comparator with a switching level that is determined by its emitrer voltage $V_E=V_M$(with, T3 being conductive for $V_E-V_B \geq 0.7v$ and blocked for $V_E-V_B<0.7v$, wherein $V_{EB}$ is the insertion voltage, about $-0.7$ V, of the emitter-base diode). The junction between resistors R5 and R6, which constitute second voltage divider 11, emits a rectangular voltage of much lower amplitude and, if the division ratio of voltage divider 11 results in an amplitude of 5 V, this voltage can be supplied directly to the input terminal of a logic circuit like a counter-divider or microprocessor. It is however, practical to employ a fourth transistor T4, an npn type, that functions as a buffer stage or voltage-level matching stage. The base of fourth transistor T4, which operates as a common-emitter circuit, is connected to the junction between resistors R5 and R6, and its emitter is connected to the negative terminal $-V_{cc}$ of a low-voltage direct-current source that is compatible with the logic level employed in digital circuits. Negative terminal $-V_{cc}$ is connected to the terminal $-V_M$ of Motor voltage-supply circuit MS, is indicated as a terminal 6 in FIG. 1, and constitutes the negative supply terminal.

The collector of fourth transistor T4 is connected through a load impedance R7 to the positive terminal 5 ($+V_M$) of the low-voltage source and directly to the speed-detection input terminal 7 of the microprocessor.

The digital component of the motor-governing loop, which is designated digital controls 9, contains a signal-processing device in the form of a microprocessor that releases an amplified digital error signal at its output terminal and has an output interface that supplies output terminal 8 with an analog control signal that is connected to the control input terminal SE of current source SQ. The signal at output terminal 8 might for example be an analog control signal, in which case the output interface of the microprocessor will be a D-A converter.

The operation of the circuitry in accordance with the invention will now be specified with reference to the aforementioned FIGS. 2A and 2B. When the motor is in the acceleration mode, as when the measured speed is lower than the desired speed, current source SQ, triggered by a signal that is proportional to the difference between the speeds, emits a powerful driving current to windings W1 and W2 through their respective switching transistors T1 and T2.

Before time $t_A$, transistor T1 is connected through and transistor T2 blocked, so that the voltage at speed-detection output terminal 2 is determined by the opposing emf that occurs due to the passage of one of the poles of the permanent-magnet rotor at the front of winding W2 through a border with an oppositely polarized adjacent pole to the next. This opposing emf consequently has the form of a positive half sine wave added to the voltage $+V_M$ at the other terminal of winding W2. Thus, the bias at the base of pnp transistor T3 will be higher than the voltage at its emitter, and transistor T3 will remain blocked with its collector voltage at zero.

This keeps fourth transistor T4 blocked, so that collector voltage V7 equals voltage $+V_{cc}$. At time $t_A$, the opposing emf passes through the zero line and Hall generator HG supplies at its voltage-output terminal V1 a negative swing that controls the block on first transistor T1, and a positive swing occurs at another voltage-output terminal V2 that connects transistor T2 through. The result is a rapid transition of voltage 2 to its residual value $V_R$ and a correspondingly rapid through-connection of third transistor T3. The collector current of third transistor T3 makes the base of fourth transistor T4 positive, so that it becomes saturated and its collector voltage V7 low (dropping to the level $V_{CEsat}$ that is).

When, at time $t_B$, Hall generator HG generates voltage swings in the opposite direction, when, that is, a pole border passes the corresponding winding, transistor T2 is blocked and transistor T1 connected through again, with transistors T3 and T4 being simultaneously blocked.

This changes voltage V7 to level $+V_{cc}$. This state is maintained until time $t_c$, when Hall generator HG again reverses its output-voltage swing. The number of periods in rectangular voltage wave V7 depends on the number of rotor-pole pairs. In the present example, illustrated in FIGS. 2A and 2B, the stator has two windings and the rotor two pairs of poles, four poles that is, which means that two periods To will be produced in rectangular wave V7 for every revolution of the motor. Since the cross-sectional values of each pole or the pole area produced by magnetization by means of externally generated magnetic fields and acting on an annular or cylindrical surface can be unequal, the precision will be considerably higher when two transitions in the same sense and corresponding to one total rotor revolution are employed to create a window fo measuring the speed—two successive periods in this case.

The aforesaid is of even greater significance when the motor is operating in the braking mode, when, that is, current source SQ is practically turned off. In this case, which is illustrated in the upper graph in FIG. 2B, the only voltage generated at winding W2 is the opposing emf generated by the motion of the poles. Thus, voltage 2 results from the superimposition of a sine voltage, the frequency and amplitude of which depends on the speed of the rotor and hence on the potential at positive supply-input terminal 1 $(+V_M)$. The upper graph in FIG. 2B is of a sine wave that varies around a mean level $+V_M$ corresponding to the emitter voltage of third transistor T3. Since the voltage alterations in the sine components in the vicinity of the zero transitions is linear and has a slope that depends on the speed, the connecting-through times ($t'_A$, $t'_C$, and $t'_E$) and blocking times ($t'B$ and $t'_D$) no longer coincide with the time at which voltage 2 crosses through the $V_M$ level because the base-emitter bias necessary for connecting transistor T3 through is several tenths of a volt negative—$V_{BEon}=0.7$ V or $V_{EBon}=0.7$ V. For the same reason, the times $t'_B-t'_A$ and $t'_D-T'_C$ are shorter than the blocking times for transistors T3 and T4. It is accordingly necessary, in order to attain a precise measurement of speed, to ensure that a window is generated with a duration T1 and the input-wave form V7 must simultaneously experiene a frequency distribution with a ratio that corresponds to the number of rotor-pole pairs. The output terminal of a frequency divider of this type, contained in the input interface, will supply a rectangular wave with a period that corresponds to 2T1 and that emits a scanning or window signal 20 with a duration T1 for every second revolution. This window signal controls for example a coincidence gate 21, the other input terminal of which obtains from clock 22 a clock signal 23 with a considerably higher frequency than the window signal. The output terminal of the gate 21 can be connected to the series or clocking input terminal of a binary counter 24 that can be reset (extinguished) by the leading edge of the window signal and that counts the number of clocking pulses during their duration. At the end of the window pulses, the parallel output terminals of the counter supply a binary word 25 that is proportional to the s of rotation and that can be compared in comparator 26 to a reference word 27 that corresponds to the desired speed.

I claim:

1. A circuit for controlling the speed of a brushless direct-current motor, comprising: a permanent-magnet rotor with a plurality of pairs of poles; a voltage supply with a first input terminal and a second input terminal; a stator with at least one pair of windings having first terminals connected to said first input terminal of said voltage supply; two switching transistors, said windings of said stator having second terminals connected to collectors of said switching transistors; a hall generator with two voltage-output terminals connected to bases of said two transistors, said two voltage-output terminals being switched on and off alternately; a controllable current source having one terminal connected to emitters of both said two transistors, said current source having another terminal connected to said second input terminal of said voltage supply; a source of high voltage with two poles connected to said first and second input terminals of said voltage supply; a voltage divider connected across one of said stator windings, said voltage divider having an output terminal; a threshold detector with input terminal connected to said output terminal of said voltage divider; said threshold detector having a reference-level input terminal connected to said one stator winding; said threshold detector having an output terminal providing a recentangular wave signal with steps, transitions between said steps of said rectangular wave signal corresponding to negatively-assuming and positively-assuming transitions in level of a voltage at least one of said stator windings.

2. A circuit as defined in claim 1, wheein said threshold detector comprises a third transistor complementary to said two switching transistors; said third transistor having a base corresponding to the input terminal of said detector, said third transistor having an emitter corresponding to said reference-level input terminal; a voltage-level matching stage having a fourth transistor operating as a common-emitter circuit; a further voltage divider said third transistor having a collector connected through said further voltage divider to said voltage-level matching stage; said fourth transistor having a supply voltage compatible with logical input levels of digital circuit.

* * * * *